L. FABIAN.
CAR FENDER.
APPLICATION FILED JUNE 18, 1909.

955,147.

Patented Apr. 19, 1910.

3 SHEETS—SHEET 1.

Witnesses
W. H. Woodson.
Cora K. Handy.

Inventor
L. Fabian,

By H. A. K. Lacey, Attorneys

L. FABIAN.
CAR FENDER.
APPLICATION FILED JUNE 18, 1909.

955,147.

Patented Apr. 19, 1910.
3 SHEETS—SHEET 2.

Witnesses
W. N. Woodson
J. M. Fallin

Inventor
L. Fabian,
By H. A. B. Lacey, Attorneys

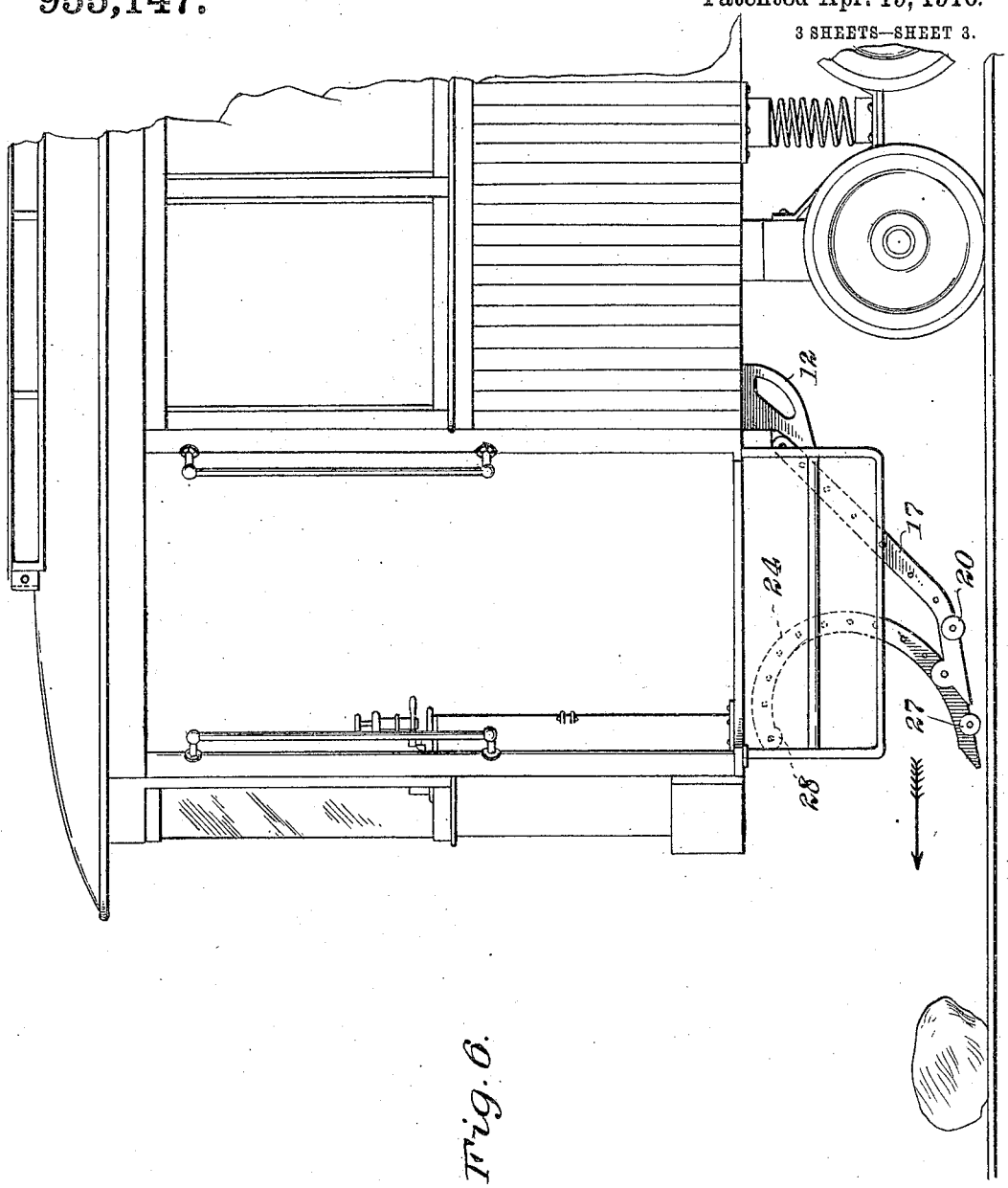

UNITED STATES PATENT OFFICE.

LAWRENCE FABIAN, OF TRACY, CALIFORNIA.

CAR-FENDER.

955,147.  Specification of Letters Patent.  Patented Apr. 19, 1910.

Application filed June 18, 1909. Serial No. 502,985.

*To all whom it may concern:*

Be it known that I, LAWRENCE FABIAN, citizen of the United States, residing at Tracy, in the county of San Joaquin and State of California, have invented certain new and useful Improvements in Car-Fenders, of which the following is a specification.

This invention relates to street car attachments and refers particularly to a novel construction of fender which is adapted to automatically raise objects from the ground which are brought into engagement therewith.

An object of this invention is to provide a car with a fender which is of simple construction and which will raise objects from the roadway immediately upon the striking of the same against the fender and will retain such objects in an upward position until the same are released upon the stopping of the car.

The invention has for another object the provision of a fender of this character which is applicable to the car beneath the same so that the car is not lengthened by the fender and so that loss of time and trouble incident to the renewal of the fender when coupling a number of cars together is obviated, and at the same time an efficient fender is produced.

The fender is also constructed so that it is compact and occupies but small space when in position beneath the car and protects persons from striking against the trucks or wheels as it raises the same from the ground.

The invention further contemplates the provision of a device of this character which may be secured to the car so as not to mar the outlines of the same and which occupies but small space beneath the car outwardly of the trucks upon which the car body is mounted.

A still further object of this invention is the provision of a fender which will adapt itself to inclined portions of the track so that the same will be disposed adjacent the ground at all times and never rested normally thereon even upon the disposition of heavy objects upon the frame of the fender.

For a full understanding of the invention reference is to be had to the following description and accompanying drawings, in which:—

Figure 1:
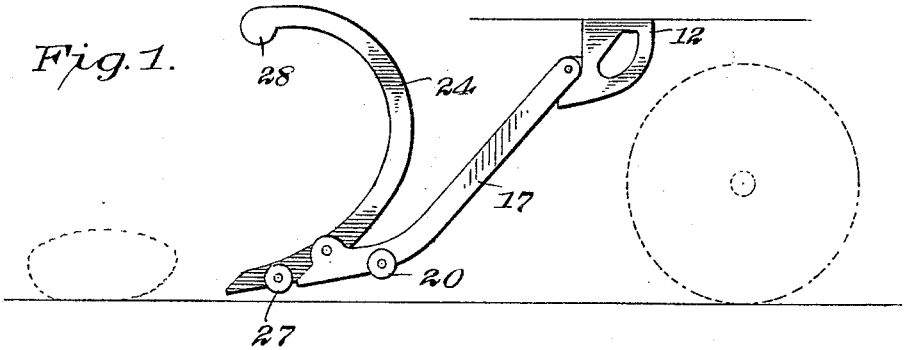
Figure 2:
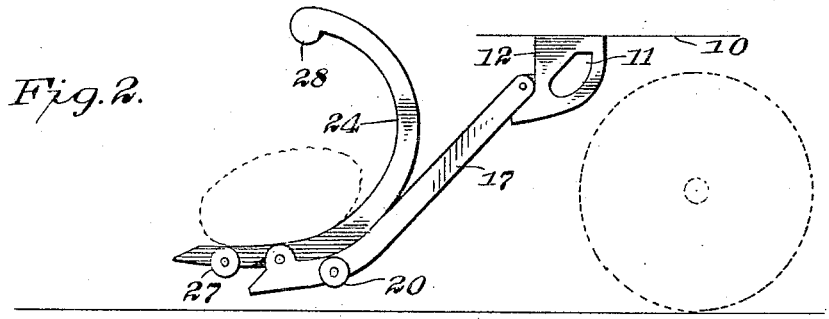
Figure 3:
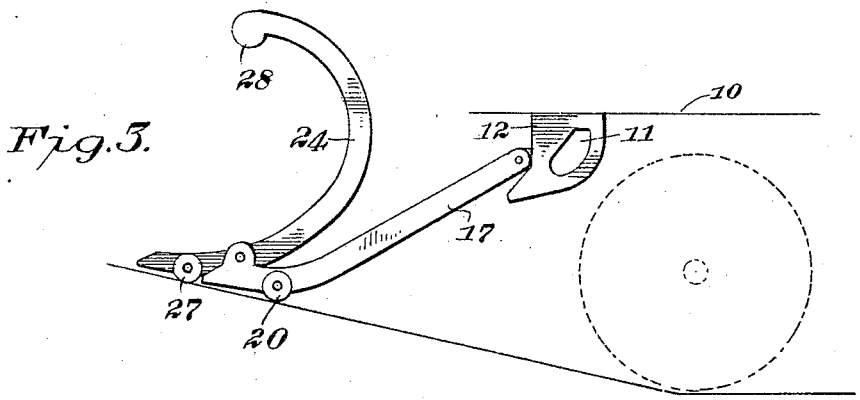
Figure 4:
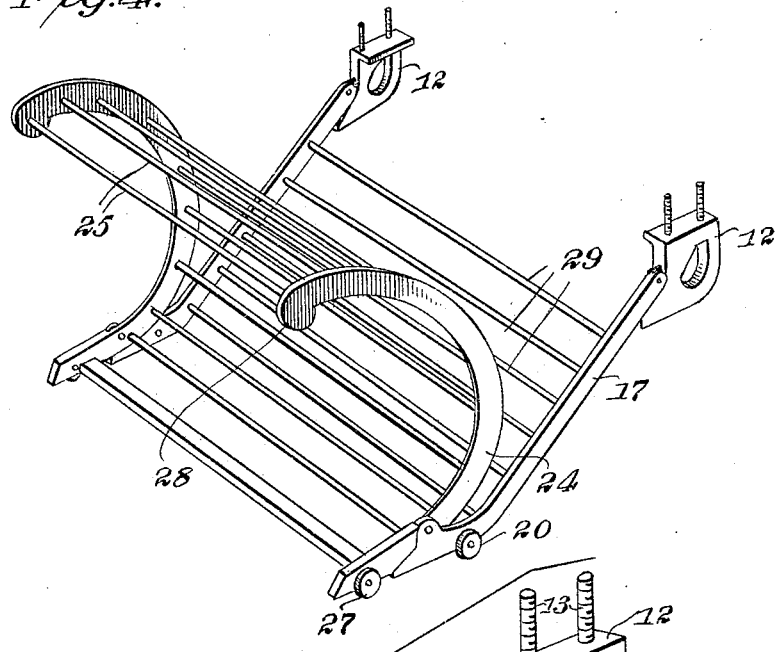
Figure 5:
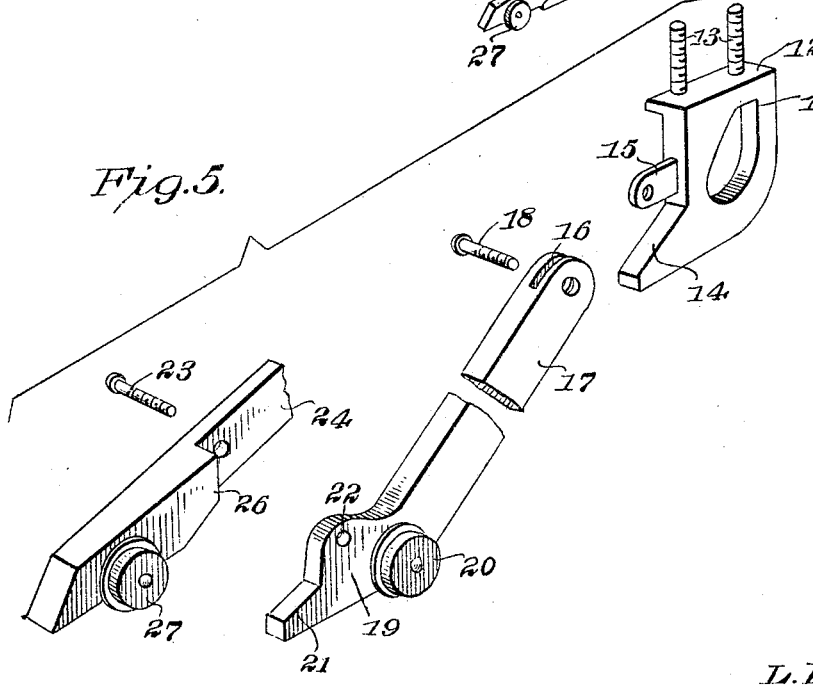

Figure 1 is a side elevation of the improved fender in a normal position. Fig. 2 is a side elevation of the fender disclosing the same after an object has been deposited thereon. Fig. 3 is a side elevation of the fender disclosing the same in position upon an inclined track. Fig. 4 is a perspective view of the complete fender in its normal position. Fig. 5 is a perspective fragmentary view of one side of the fender, the parts of the same being shown in a detached position, and Fig. 6 is a side elevation of the improved fender as applied to the end of a car, the car being broken away.

Corresponding and like parts are referred to in the following description and indicated in all the views of the drawings by the same reference characters.

Referring to the drawings the numeral 10 designates the bottom of a car upon which the fender is engaged and the same is provided with a pair of supports 11 which are flanged as at 12 and provided with upwardly extended bolts 13 which engage through the bottom 10 of the car and support the same adjacent the opposite edges thereof. The supports 11 are each provided at their lower ends with forwardly extended shoulders 14 which are disposed at an inclined angle and which are also provided with lugs 15 extended outwardly from their forward edges, the lugs 15 being of reduced thickness to permit of the insertion of the same within slots 16 formed in the upper extremities of supporting levers 17. The supporting levers 17 are apertured at their upper ends for the reception of bolts 18 which engage through the lugs 15 and serve to pivotally mount the levers 17 upon the supports 11. The levers 17 are adapted to extend downwardly and forwardly in their normal position and rest upon the shoulders 14 to dispose their lower extremities slightly above the roadway or track upon which the car frame is mounted. The lower ends of the levers 17 are provided with forwardly extended offset portions 19 which carry flanged wheels 20 for engagement with the track at times to support the levers 17 and which also carry at their forward extremities shoulders 21. The offset portions 19 are provided with projections 22 which extend upwardly from the outer ends thereof adjacent the shoulders 21 which are apertured for the reception of the bolt 23 to pivotally support a receiving frame therebetween. The receiving frame comprises a pair of arcuate braces 24 which are disposed in parallel and secured in such relation by the employment of a plurality of transverse bars 25 rigidly disposed between the same. By this arrangement it is readily observed that a practically semi-circular receptacle is formed which is adapted for the reception of objects which are brought into engagement with the same. The braces 24 are each provided at their lower ends with shoulders 26 which are outwardly formed thereon and which are adapted for normal engagement against the shoulders 21 to support the receptacle by reason of the weight of the over-hanging upper portion of the same which is curved forwardly beyond the pivotal center of the receptacle. The braces 24 are apertured at points in juxtaposition to the shoulders 26 and spaced rearwardly therefrom for the reception of the bolts 23 to secure the receptacle pivotally upon the lower ends of the supporting levers 17. The lower ends of the braces 24 are further provided with flanged wheels 27 mounted against the outer faces of the same and adapted to engage with the track when the same is inclined or when the fender is sufficiently vibrated to bring the receptacle into engagement with the track. The upper over-hanging portion of the receptacle is weighted by means of the enlarged extremities 28 which are formed upon the braces 24, the same being tapered downwardly to the lower points of the braces 24 upon which the object is brought into contact.

If it is desired in lieu of the brace rods or bars 25, rollers may be rotatably disposed between the braces 24 for the purpose of lessening the friction between the rollers and the object which is raised by the fender to enable the more ready operation of the same.

The supporting levers 17 are provided with a plurality of transverse rods 29 which serve to form a platform for the reception of the braces 24 in order to retain the same from engagement with the ground when they are swung backward. The rods 29 also serve the purpose of retaining the levers 17 in a fixed parallel position during all adjustments of the same.

The operation of the device is as follows:—As the car is moved forwardly and an object is thrown in the path of the same, the object strikes the lower end of the receptacle and, by the motion of the car the object is thrown backwardly within the receptacle where it falls rearwardly of the pivotal support of the same and thereby causes the swinging of the braces 24 into a backward position raising the shoulder 26 out of engagement with the shoulder 21. The receptacle when thrown backwardly engages upon the shoulders 21 and is thereby retained in such position above the ground and, by reason of the disposition of the weight of the object rearwardly of the pivot of the receptacle the same will remain in such upward position until it is forced forwardly by the withdrawal of the object therefrom and the application of an outside force. Simultaneously with this operation the fender is thrown downwardly to engage the wheels 20 and 27 upon the tracks to support the fender and to lessen the frictional engagement between the same and the track. When the car is started up an incline the wheels 27 and 20 respectively engage with the track and raise the fender upwardly to prevent the wedging of the same against the roadway and thereby prevent any breakage or strain of the fender.

In providing a fender of this construction it is readily observed that it may be positioned beneath the car and that it does not protrude beyond the end of the platform of the same so that the car is not lengthened by the application of this fender.

The provision of the shoulders 14 retains the supporting levers 17 from dropping below a predetermined point above the rails, but admits of the upward movement of the levers 17 when the flanged wheels 20 are raised by contact with the track.

Having thus described the invention what is claimed as new is:—

1. A car fender as specified comprising a pair of supports rigidly mounted upon a car frame, a pair of levers fulcrumed upon said supports, shoulders formed on said supports for normal engagement with said levers for supporting the same, a pair of arcuate braces pivotally mounted adjacent the lower ends to the forward ends of said levers, a plurality of rods transversely positioned between said braces and flanged wheels carried upon the lower ends of said lever and upon said braces.

2. A device as specified comprising a pair of supports, levers pivotally mounted upon said supports, a pair of braces pivotally disposed between said supports, said braces being of arcuate form and having their extremities positioned forwardly, said braces being pivoted adjacent their lower ends, a plurality of transverse rods disposed between said levers, a pair of flanged wheels positioned upon the lower ends of said levers and a second pair of flanged wheels mounted upon the lower ends of said braces.

3. A device as specified comprising a pair of supports depended from the car frame, lugs of reduced thickness forwardly extended from said supports, a pair of levers having slots formed in the upper ends of the same and pivotally secured upon said lugs, shoulders carried by said supports for engagement with said lever to prevent the downward movement of the same, a pair of braces fulcrumed in the lower extremities of said levers, shoulders formed upon the outer faces of said braces and adapted for engagement with said shoulders on said levers, pivot pins disposed through said braces and the lower ends of said levers and a plurality of rods disposed between said braces.

4. A car fender including supports, levers carried by said supports and forwardly extended from the same and a receptacle pivotally mounted between the forward ends of said levers, the upper end of said receptacle being advanced outwardly of the pivotal axis of the receptacle to normally retain the same in a forward position.

5. A car fender including supports, levers mounted on said supports, a receptacle pivotally disposed between said levers, the inner end of said receptacle being normally swung outwardly above and beyond the pivotal axis of said receptacle, and weights disposed upon the inner end of said receptacle for retaining the same in normal position.

6. A car fender including a pair of rigid supports, levers pivotally mounted upon said supports, shoulders formed on said supports for engagement with said levers to limit the downward movement of the same, wheels carried upon the forward ends of said levers for engagement with inclined portions of the track to raise said levers, and a receptacle disposed between the forward ends of said levers.

In testimony whereof I affix my signature in presence of two witnesses.

LAWRENCE FABIAN. [L. S.]

Witnesses:
 A. G. BOGGS,
 E. C. O'BRIEN.